(12) United States Patent
Müller

(10) Patent No.: US 12,235,431 B2
(45) Date of Patent: Feb. 25, 2025

(54) DEVICE FOR INCORPORATION INTO A MICROSCOPE, METHOD FOR CONTACTING MICROSCOPE COMPONENTS ON A ROTOR OF A MICROSCOPE, AND MICROSCOPE

(71) Applicant: Carl Zeiss Microscopy GmbH, Jena (DE)

(72) Inventor: Martin Müller, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 536 days.

(21) Appl. No.: 17/468,248

(22) Filed: Sep. 7, 2021

(65) Prior Publication Data

US 2022/0082809 A1 Mar. 17, 2022

(30) Foreign Application Priority Data

Sep. 17, 2020 (DE) .................. 10 2020 124 224.7

(51) Int. Cl.
*G02B 21/24* (2006.01)
(52) U.S. Cl.
CPC .................. *G02B 21/248* (2013.01)
(58) Field of Classification Search
CPC .................................. G02B 21/248
USPC ........................................ 359/348
See application file for complete search history.

(56) References Cited

U.S. PATENT DOCUMENTS 4,515,439 A * 5/1985 Esswein ............ G02B 21/02
359/821
5,818,637 A * 10/1998 Hoover ............ G03F 7/70216
359/821
9,888,886 B2 2/2018 Distler et al.
2004/0061861 A1* 4/2004 Rentzsch ............ G02B 21/248
250/231.13
2004/0223226 A1* 11/2004 Liang .................. G02B 21/002
359/619

(Continued)

FOREIGN PATENT DOCUMENTS

DE 102013221169 A1 4/2015
DE 102018205894 A1 10/2019

(Continued)

OTHER PUBLICATIONS

Search Report for Application No. DE 10 2020 124 224.7, (no english translation available), Feb. 9, 2021, 6 pages.

*Primary Examiner* — Sharrief I Broome
(74) *Attorney, Agent, or Firm* — LaBatt, LLC

(57) ABSTRACT

The invention relates to a device for incorporation into a microscope comprising a stator for connecting to a static component of a microscope and a rotor arranged rotatably relative to the stator. The rotor has mounting locations for receiving microscope components. An electrical rotary feedthrough is present comprising a first part, which is connected to the stator, and a second part, which is connected to the rotor. At least one electrical connection is formed via the electrical rotary feedthrough between the stator and the rotor and an electrical connection is formed on the rotor from the second part of the rotary feedthrough to at least one of the mounting locations for the purpose of electrically contacting a microscope component. The invention also relates to a microscope and a method for contacting microscope components on a rotor of a microscope.

24 Claims, 5 Drawing Sheets

(56) References Cited

U.S. PATENT DOCUMENTS

| | | | |
|---|---|---|---|
| 2006/0141609 A1* | 6/2006 | Kagayama | C12M 23/50 |
| | | | 435/287.1 |
| 2011/0069379 A1* | 3/2011 | Becker | G02B 21/365 |
| | | | 359/368 |
| 2014/0009740 A1* | 1/2014 | Makino | G02B 21/248 |
| | | | 351/206 |
| 2017/0198856 A1* | 7/2017 | Voigt | F16M 11/18 |
| 2018/0157020 A1* | 6/2018 | Kamada | G01J 3/28 |
| 2018/0275386 A1* | 9/2018 | Yu | G02B 21/06 |
| 2019/0324255 A1* | 10/2019 | Pergande | G02B 21/248 |
| 2021/0011267 A1* | 1/2021 | Fahlbusch | G02B 7/14 |

FOREIGN PATENT DOCUMENTS

| | | | | |
|---|---|---|---|---|
| DE | 102018205897 A1 | 10/2019 | | |
| EP | 0085844 A1 | 8/1983 | | |
| EP | 1794638 B1 | 1/2012 | | |
| WO | 2006/037490 A1 | 4/2006 | | |
| WO | 2012023255 A1 | 2/2012 | | |
| WO | WO-2016123927 A1 * | 8/2016 | | G02B 13/0065 |

* cited by examiner

DEVICE FOR INCORPORATION INTO A MICROSCOPE, METHOD FOR CONTACTING MICROSCOPE COMPONENTS ON A ROTOR OF A MICROSCOPE, AND MICROSCOPE

REFERENCE TO RELATED APPLICATIONS

The current application claims the benefit of German Patent Application No. 10 2020 124 224.7, filed on 17 Sep. 2020, which is hereby incorporated by reference.

TECHNICAL FIELD

The present invention relates in a first aspect to a device for incorporation into a microscope according to the preamble of claim 1. In a second aspect, the device relates to a microscope according to the preamble of claim 11. Finally, the invention relates to a method for contacting microscope components on a rotor of a microscope.

BACKGROUND ART

A device of the generic type for incorporation into a microscope is known in numerous variants in the prior art, for example from WO2006/037490A1, and has at least the following components: a stator for connecting to a static component, in particular a stand, of a microscope, a rotor arranged rotatably relative to the stator, wherein the rotor has a plurality of mounting locations configured in each case for receiving a microscope component, in particular an optical unit component.

A microscope of the generic type is likewise known in numerous variants from the prior art, for example from WO2006/037490A1, and includes at least the following components: at least one microscope objective, a holder for holding a sample to be examined, and a light source for providing illumination light.

A modern microscope system consists of a multiplicity of optical and motorized components. In order to be able to fulfill the multiplicity of applications, these components should be interchangeable. After a microscope has been switched on, it is therefore desirable for the microscope to recognize which of the changeable components are present. It is known to use specific storage media (e.g. DS2431, manufactured by Maxim) in such interchangeable components in order to store information concerning the respective component. Such solutions are described in WO2006/037490A1. In practice, for example, changeable microscope components (e.g. objectives or filter cubes) can be identified. Such components are often arranged on so-called turrets (e.g. objective turret, reflector turret). In known solutions, the changeable components are read only at a specific location on the turret. That means that a complete or almost complete revolution of the respective turret is always required in order to be able to make electrical contact with all components at least once and to read out the information associated with the respective component. Since a complete or almost complete revolution of the turret is required for reading the components, in known solutions the component recognition process is generally carried out only after having been expressly requested by a user.

A further general type of problem in this context also concerns the operation of motorized components fitted on the turrets (e.g. motorized correction ring objective on the objective turret). In known solutions, the motorized correction ring objective is connected to the stand by an external line. Since the objective turret is rotatable, the connecting line for the correction ring objective winds around the turret during rotation. Therefore, there is the risk of the connecting line being torn away if the turret is inadvertently rotated too far. In order to reliably avoid the tearing away, it is possible, admittedly, to incorporate limitations such that the objective turret can be maximally rotated only by half a revolution in each case in one direction and the other. However, the latter naturally restricts the freedom of operator control.

SUMMARY OF THE INVENTION

A problem addressed by the invention can be considered that of providing a device for incorporation into a microscope and a microscope in which a multiplicity of microscope components can be changed particularly flexibly. In addition, the identification of the respective component is intended to be possible in a particularly simple manner. Finally, the intention is to specify a method for contacting microscope components on a rotor of a microscope.

This problem is solved by means of the device having the features of claim 1, by means of the microscope having the features of claim 11 and by means of the method having the features of claim 13.

Preferred configurations of the device according to the invention, of the microscope according to the invention and of the method according to the invention are described below, in particular with reference to the dependent claims and the figures.

The device of the type specified above is developed according to the invention in that an electrical rotary feedthrough is present comprising a first part, which is connected to the stator, and a second part, which is connected to the rotor, in that at least one electrical connection is formed via the electrical rotary feedthrough between the stator and the rotor, and in that an electrical connection is formed on the rotor from the second part of the rotary feedthrough to at least one of the mounting locations for the purpose of electrically contacting a microscope component that is to be arranged in said mounting location.

In the case of the microscope of the type specified above, according to the invention there is a device according to the invention present.

In the case of the method according to the invention for contacting microscope components on a rotor of a microscope, the device according to the invention is used. Then, according to the invention, a microscope component is mounted at at least one, preferably at a plurality and in particular at each of the mounting locations of the rotor, and the microscope component or the microscope components, at least for the energy supply thereof and/or for the driving thereof, is or are electrically connected to a microscope controller via the rotary feedthrough.

The device according to the invention serves for incorporation into a microscope. This is also taken to mean situations in which a functional microscope is only realized as a result of the incorporation of the device according to the invention.

The terms stator and stand are taken to mean components which, during use of the microscope as intended, do not move, that is to say are static, relative to a work environment, for example relative to a work table on which the microscope stands.

The term rotor is taken to mean a component which is secured to the stator, in particular releasably, such that it can be rotated relative to the stator, in particular by arbitrary angles of rotation. The terms rotor and turret are used largely synonymously in the present application.

A mounting location is understood to mean a facility on the rotor which enables a microscope component, for example an objective or a filter cube, to be mounted, in particular releasably, on the rotor. In order to realize such mounting locations, the rotor, in a manner that is known in principle, can be provided with threads, holes, receiving slots and similar configurations.

For the purposes of the present description, the term microscope component denotes any kind of interchangeable component that can be used in light microscopes. The term optical unit component denotes such components which affect the light in some way, for example through diffraction, refraction, rotation of the polarization and/or spatial and/or spectral filtering.

In general, such components, in particular such optical unit components, have mechanical facilities, for example a frame, a mount or a housing, which serve for the expedient mechanical connection and fixing of the relevant microscope component to the mounting location. These mechanical facilities are always concomitantly meant in the context of the term optical unit component for the present description.

The microscope components which can be addressed via the rotary feedthrough and which can be introduced into the beam path of the microscope can be one or more of the following components: Objectives, filter elements (colour filters, neutral filters, spatial filters, stops), beam splitters, attachments such as screw collar rings, union sleeves, housings for example for component recognition, beam deflecting means, DIC sliders, TIC sliders, cameras, condensers, light sources, changeable turrets, TV ports, tubes, prisms, mirrors, micro-filter plates, object carriers.

The term light source is taken to mean fundamentally known units, in particular lasers, which provide the illumination light having the desired properties for the respectively desired contrast-imparting effect (transmitted light, reflected light, dark field illumination, oblique light illumination, point illumination, wide field illumination, etc.).

The term essential to the present invention is that of the electrical rotary feedthrough. The latter is a component which enables at least one electrical connection, preferably a plurality of electrical connections, between a first part, which can be connected to the stator, for example, and a second part, which can be connected to the rotor, for example. Such electrical rotary feedthroughs are commercially available in a large number of variants and for a large number of purposes of use.

What can be considered to be a central concept of the present invention is dispensing with the permanent contact-connections via connecting lines as used in the prior art, and instead effecting permanent contact-connections of components via a rotary feedthrough.

What can be regarded as one major advantage of the invention is that the permanent contact-connections of microscope components via a rotary feedthrough no longer impose on the user any restriction relating to the rotation of the turret.

A further major advantage is that in contrast to the prior art solutions in which the microscope components are contacted only temporarily and identifying all components present on a turret therefore necessitates a test run of the turret, all microscope components present on the turret are addressable and identifiable at any time.

The invention enables simple and universal operation of electrical, electromechanical and electronic functions realized on a rotatable component, typically objectives on an objective turret or filter cubes in a reflector turret.

With the aid of a so-called rotary feedthrough, e.g. an encapsulated slip ring solution (e.g. RotarX series manufactured by B-Command), incorporated in a hollow shaft, for example, all kinds of electronics (e.g. storage media, motors, sensors, illumination, etc.) of all changeable microscope components can be read, addressed and/or used at any point in time. By virtue of the encapsulated slip ring, an electrical contact is present continuously, that is to say in each of the rotational positions and also during the rotation of a turret. It is practically as if the component were connected continuously via a line. After the microscope has been switched on, therefore, there is no need for a mechanical movement of the turrets or other components in order for example to be able to read the storage components (in the microscope components themselves or in functional components fitted to the respective microscope components) of all changeable microscope components and thus to recognize the microscope component.

It is possible for the storage media to be read in a very short time (milliseconds range). Since movements of the turret are no longer required and the read-out process is concluded within a few milliseconds, the invention makes it possible to be able to carry out the process of recognizing the microscope components upon every apparatus start or else in the meantime, without the user experiencing any restriction in the use of the microscope.

Furthermore, the invention makes it possible that even microscope components that are interchanged during the operation of the microscope, for example interchanged filter cubes, are automatically recognized. The advantage then achieved vis à vis EP1794638B1 is that arbitrary storage components can be used. Previously, with the solution from EP1794638, the storage media were limited to 4 kbits. The use of the rotary feedthrough obviates this restriction and enables larger storage components to be used. With larger storage media, other bus systems (e.g. I2C bus or SPI bus) are often used. These bus systems admittedly have the disadvantage over the Maxim 1-wire bus that more lines are needed. However, this can be solved in an uncomplicated manner by the use of a rotary feedthrough with enough slip rings.

Furthermore, the slip ring affords the advantage that in the case of motorized microscope components on turrets (e.g. motorized objectives), the external wiring arrangements can be obviated. Thus there is no longer the risk of the external line becoming wound up and tearing away.

Moreover, it is possible to address these motorized components even when they are not situated in the beam path of the stand. In this regard, by way of example, in the case of a motorized correction ring objective, the correction ring can already be moved into a predetermined position before the objective is actually pivoted into the beam path.

For realizing the invention it is sufficient if an electrical connection is formed on the rotor to one of the mounting locations. In one advantageous and expedient variant, an electrical connection is formed on the rotor from the second part of the rotary feedthrough to each of the mounting locations for the purpose of electrically contacting microscope components that are to be arranged respectively in the mounting locations. Each of the microscope components mounted on the mounting locations can then be addressed or actuated at any point in time.

In a further preferred configuration of the device according to the invention, at at least one mounting location, preferably at each of the mounting locations, a contacting device is present for contacting microscope components that are to be arranged in the respective mounting locations. Expediently, the contacting device(s) are configured such that contacting with a specific microscope component is effected automatically upon insertion or mounting of the microscope component on or at the respective mounting location. It is clear that corresponding contacting device must then also be present at the respective microscope components.

Advantageously, a contacting device is present at at least one mounting location or preferably at a plurality or each of the mounting locations, for the purpose of contacting functional components respectively connected to microscope components that are to be arranged in the respective mounting locations. Each of the microscope components mounted on the mounting locations can then be addressed or actuated at any point in time by way of the respective functional components.

The invention is realized if a mounting location on the rotor is equipped with a microscope component and said microscope component is identified and/or operated by way of the electrical rotary feedthrough. The advantages of the invention are especially realized if a plurality and preferably each of the mounting locations of the rotor are equipped in each case with a microscope component.

Advantageously, a functional component is fitted to at least one microscope component and preferably to a plurality or each of the microscope components or optical unit components. At least one, preferably a plurality and in particular each of the functional components can provide at least one of the following functions: Identifying the microscope component and/or providing information about the microscope component on which the relevant functional component is arranged, a sensor function, an actuator function, an interface function to further constituents of the microscope components. The term interface function should also be taken to mean the simple provision of a contacting to the relevant microscope component.

Arbitrary electronic circuits, sensors and actuators can be realized in the microscope components and/or in the functional components. The limitations are the available structural space, the number of electrical connections provided via the rotary feedthrough and, associated therewith, the available electrical power and, if appropriate, the available bandwidth for a data transfer.

With regard to the method according to the invention it is preferred for a functional component to be fitted to at least one and preferably to each of the microscope components, and for at least one, preferably a plurality and in particular each of the functional components to provide at least one of the following functions: Identifying the and/or providing information about the respective microscope component on which the relevant functional component is arranged, a sensor function, an actuator function, an interface function to further constituents of the microscope components.

In one advantageous variant of the method according to the invention, the microscope components can be identified by way of a functional component respectively present.

Particularly preferably, the microscope components mounted on the mounting locations of the rotor can be identified automatically upon an apparatus start of the microscope and/or during the operation of the microscope, in particular when the rotor is at a standstill in comparison with the stator. This variant shows particularly clearly the advantages in comparison with the prior art, where all components for recognition purposes have to be moved to a specific position with the aid of the rotor.

The present invention in particular also makes possible a variant of the method in which identifying, driving, reading and/or operating the microscope components and/or the functional components are/is carried out independently of the rotational position of the rotor and/or independently of whether or not the rotor is rotating.

In a special case of this last variant, microscope components that are to be initialized and/or set electrically in a specific manner can also be initialized and/or set before they are brought into the beam path of the microscope as a result of rotation of the rotor. As a result, time can be saved during the operation of the microscope.

A further preferred variant of the device according to the invention is characterized in that a position sensor is present for determining a rotational position of the rotor relative to the stator. This increases the convenience of operator control because in addition to the information about which components are situated on the rotor or turret, it is now possible to ascertain at any point in time which of the components is currently situated in the beam path or how far is the travel distance for the rotor to bring a specific microscope component into the beam path.

For driving the rotor or turret, an electric motor, for example of a stepper motor, can be present in a manner known per se.

The electrical connections to the microscope components can serve to provide a power supply of the respective microscope components. Alternatively or supplementarily, data transfer, in particular bidirectional data transfer, is possible. By way of example, measurement data of a sensor, for example of a temperature sensor, can be transferred from the respective microscope components back to a microscope controller. On the other hand, it is also possible for example for a characteristic curve which is of importance for the operation of the respective microscope component to be written for instance to a memory chip in the functional component on a microscope component. In advantageous variants of the device according to the invention, in the rotary feedthrough electrical lines for realizing a bus system, in particular one or more 1-wire buses, a digital bus system, and/or power supply lines can be present for a power supply and/or for a data connection to the optical unit components and/or to functional components fitted to the microscope components.

Finally, via the electrical lines in the rotary feedthrough, control commands can also be communicated to actuators which form the microscope components or which are connected to microscope components, for example microscope objectives. For example, control commands can be communicated to adjustable microscope objectives or to heating elements.

The transmission of energy and/or information between the controller and the microscope components can be effected, in principle, using known protocols and/or bus systems, for example RS232, RS422, CAN, USB, i$^2$C, SPI, etc.

For the microscope according to the invention, a microscope controller can expediently be present, which is connected to the device according to the invention via a bus system and/or power supply lines.

The device according to the invention can advantageously be embodied as an objective turret or as a filter changer.

BRIEF DESCRIPTION OF THE DRAWINGS

Further advantages and features of the invention are explained below with reference to the figures. In the figures.

DETAILED DESCRIPTION OF THE INVENTION

The exemplary embodiment of a device 100 according to the invention as shown schematically in FIGS. 1 and 2 will be described jointly with the embodiment variant of a microscope 200 according to the invention as illustrated schematically in FIG. 3. Identical and identically acting components are generally identified by the same reference signs in the figures.

Figure 1:
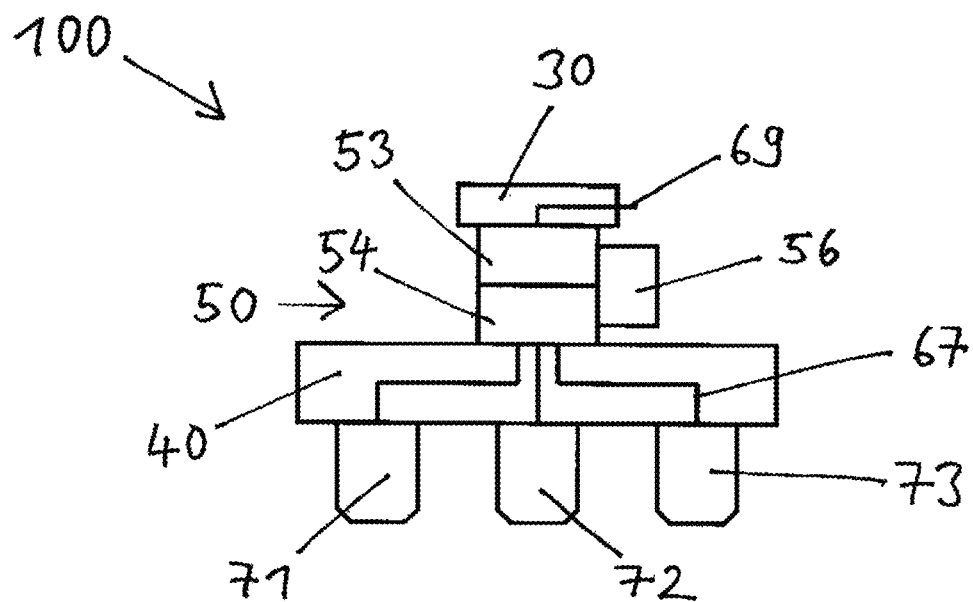
FIG. 1 shows a schematic illustration of one exemplary embodiment of the device according to the invention.
Figure 2:
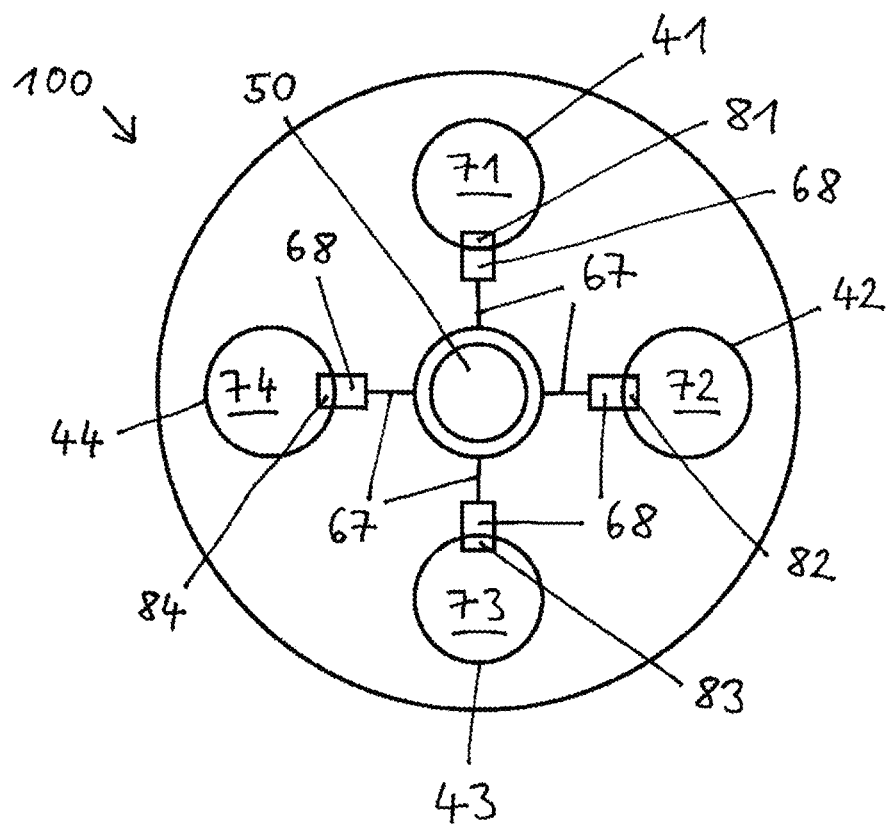
FIG. 2 shows a schematic sectional view of the device from FIG. 1.

The device 100 according to the invention as shown in FIGS. 1 and 2 for incorporation into the microscope 200 includes as essential components firstly a stator 30 for connecting to a static component, in particular a stand 94, of the microscope 200 and a rotor 40 arranged rotatably relative to the stator 30. The rotor 40 has a plurality of mounting locations 41, 42, 43, 44 configured in each case for receiving a microscope component 71, 72, 73, 74.

According to the invention, an electrical rotary feedthrough 50 is present comprising a first part 53, which is connected to the stator 30, and a second part 54, which is connected to the rotor 40. At least one electrical connection 67, 69 is formed via the electrical rotary feedthrough 50 between the stator 30 and the rotor 40. Each of the schematically shown lines 67, 69 can represent a plurality of electrical lines present in reality.

An electrical connection 67 is formed on the rotor 40 from the second part 54 of the rotary feedthrough 50 in the exemplary embodiment shown in FIG. 2 to each of the mounting locations 41, 42, 43, 44 for the purpose of electrically contacting a microscope component 71, 72, 73, 74 arranged in the respective mounting location 41, 42, 43, 44. In the exemplary embodiments illustrated in FIGS. 1 to 3, the microscope components are optical unit components, specifically various microscope objectives 71, 72, 73, 74, each one of which can be positioned in a beam path of the microscope 200 by means of corresponding positioning of the rotor 40 relative to the stator 30.

In the embodiment variant shown, a position sensor 56 is present for establishing a relative position of the rotor 40 relative to the stator 30, the measurement data of which position sensor can be processed for example by a controller 99 of the microscope.

In the exemplary embodiment shown in FIGS. 1 and 2, each of the microscope objectives 71, 72, 73, 74 is provided with a functional component 81, 82, 83, 84. The functional components 81, 82, 83, 84 each have a memory chip, not illustrated, on which information about the respective microscope objective 71, 72, 73, 74 is stored. This information makes it possible at least to identify the respective microscope objective 71, 72, 73, 74. In addition, it is possible to store further data, for example technical characteristic curves of the respective individual microscope objective 71, 72, 73, 74, on the associated functional components 81, 82, 83, 84.

In the embodiment variant shown, in addition contact units 68 are respectively present at the mounting locations 41, 42, 43, 44, and the respective functional components 81, 82, 83, 84 can be contacted via said contact units. This contacting can be effected by producing electrically conductive connections in the manner of a plug connection. However, the contacting need not necessarily be of electrically conductive nature. By way of example, the functional components 81, 82, 83, 84 can also be written to or read magnetically or electro-optically.

Figure 3:
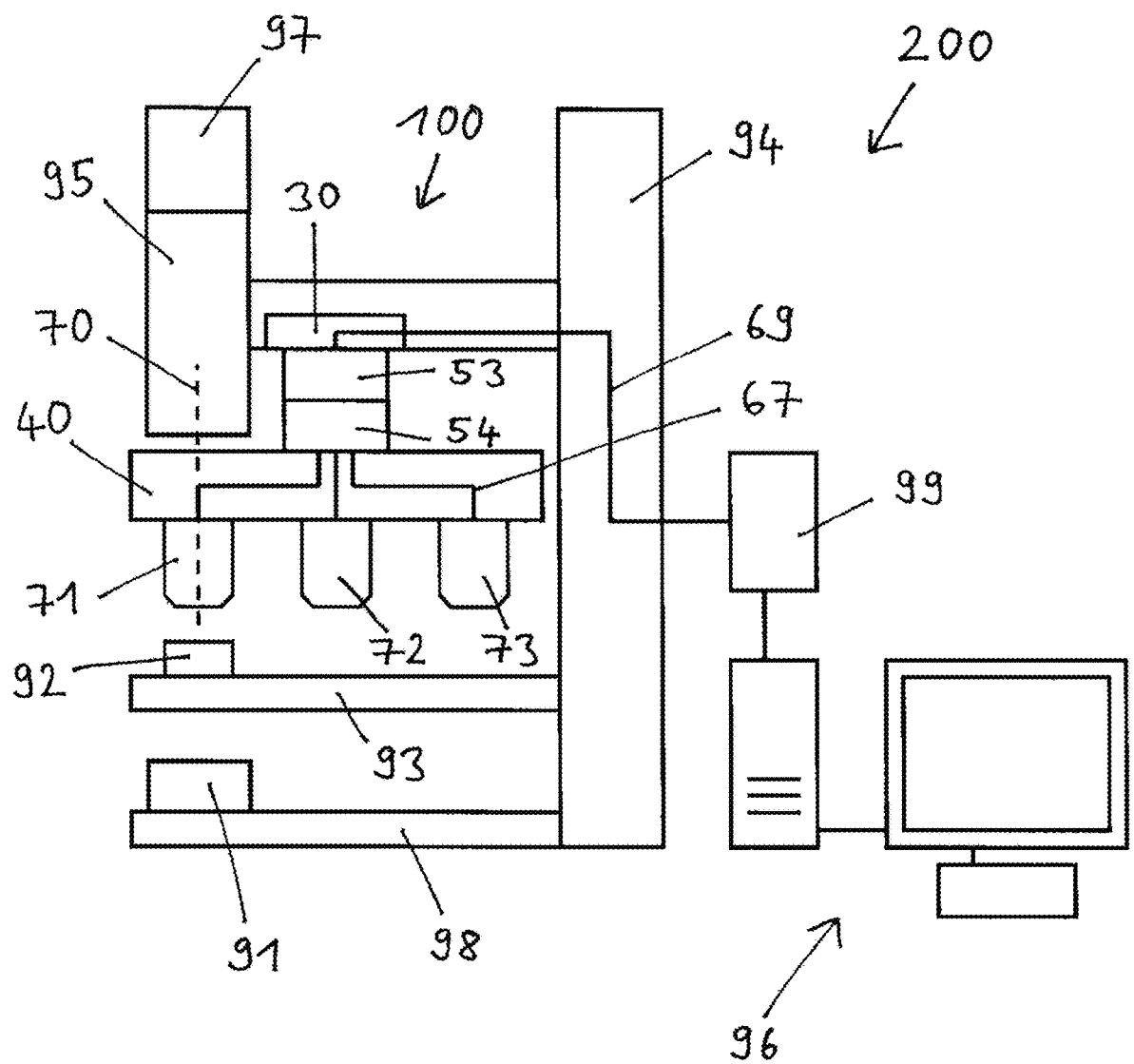
FIG. 3 shows a schematic illustration of one exemplary embodiment of a microscope according to the invention.

The device 100 according to the invention is incorporated in the microscope 200 shown schematically in FIG. 3. In this case, the static part 30 of the device 100 is connected to the stand 94 of the microscope 200. The microscope 200 additionally includes a tube 95, which, in a manner known in principle, can contain further optical constituents, for example a tube lens (not shown in the figure), and is likewise connected to the stand 94 in a manner not illustrated in more specific detail. In addition, a sample holder 93 for holding a sample 92 to be examined and a light source 91 mounted on a base 98 are present. The sample holder 93 and the base 98 are likewise connected to the stand 94 in the schematic exemplary embodiment in FIG. 3. An optical axis of the system is identified by the reference sign 70. Downstream of the tube 95 there follows a unit 97 that can contain an eyepiece and/or a camera.

Finally, a controller 99 is present for controlling the microscope 200, which controller can be connected to a control computer 96 with customary peripheral components (screen, keyboard, mouse). The controller 99 can also be integrated into the control computer 96 or be realized by the control computer 96. The controller 99 can in particular read out the measurement data of the position sensor 56. Together with a motorized drive for the rotor 40, this drive not being illustrated in the figure and being realized in a manner known in principle, a respectively desired microscope component 71 can be positioned in the beam path. Each of the microscope objectives 71, 72, 73, 74 can be identified by the controller 99 via the line connection 69 in principle at any point in time and, if present on the respective functional components 81, 82, 83, 84, further information concerning the microscope objectives can likewise be read out by the controller 99 at any point in time.

Different variants of the contacting of microscope components 71, 72, 73 will be described with reference to FIGS. 4, 5 and 6.

Figure 4:
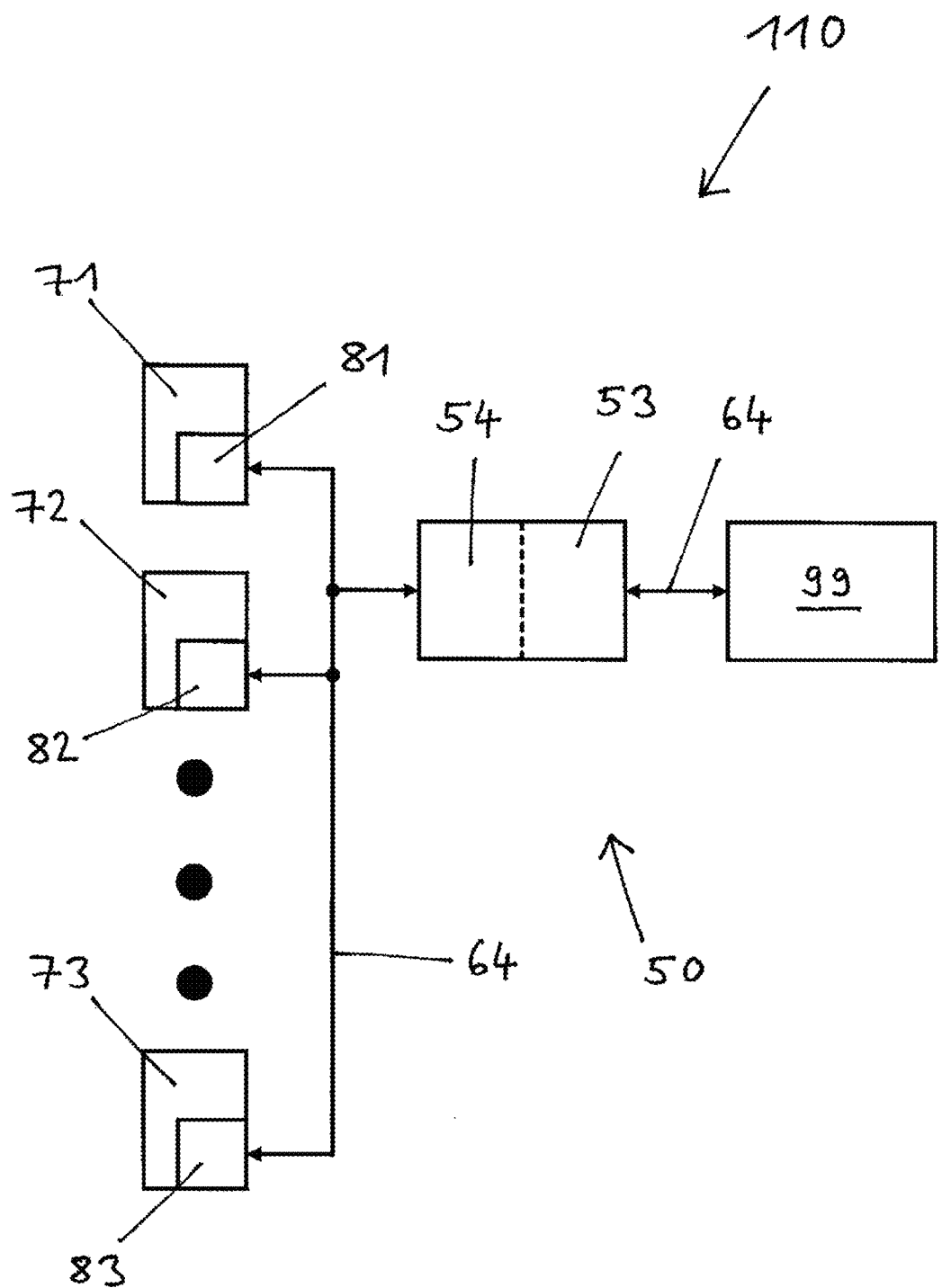
FIG. 4 shows a block diagram of a further exemplary embodiment of the device according to the invention.
Figure 5:
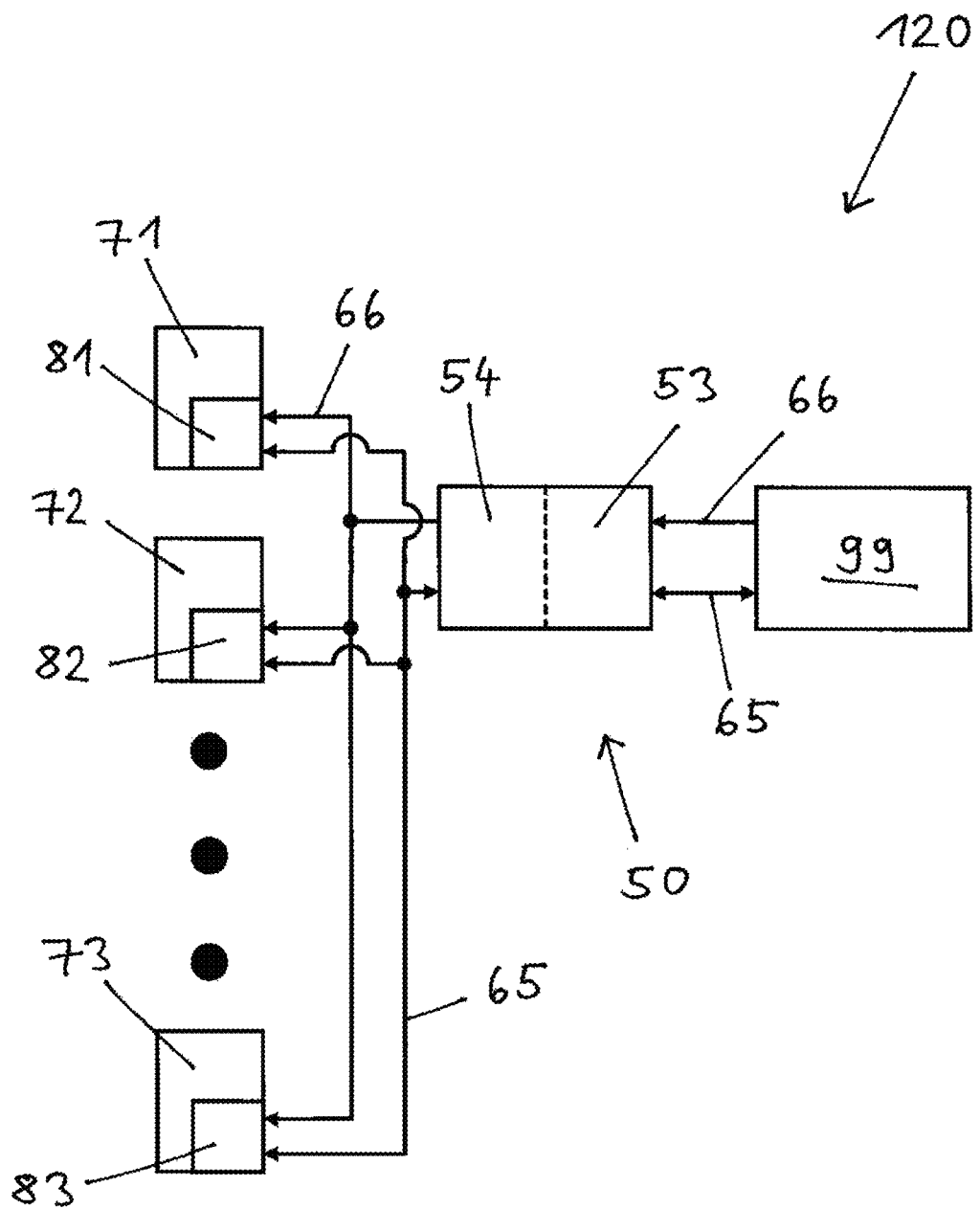
FIG. 5 shows a block diagram of a further exemplary embodiment of the device according to the invention.
Figure 6:
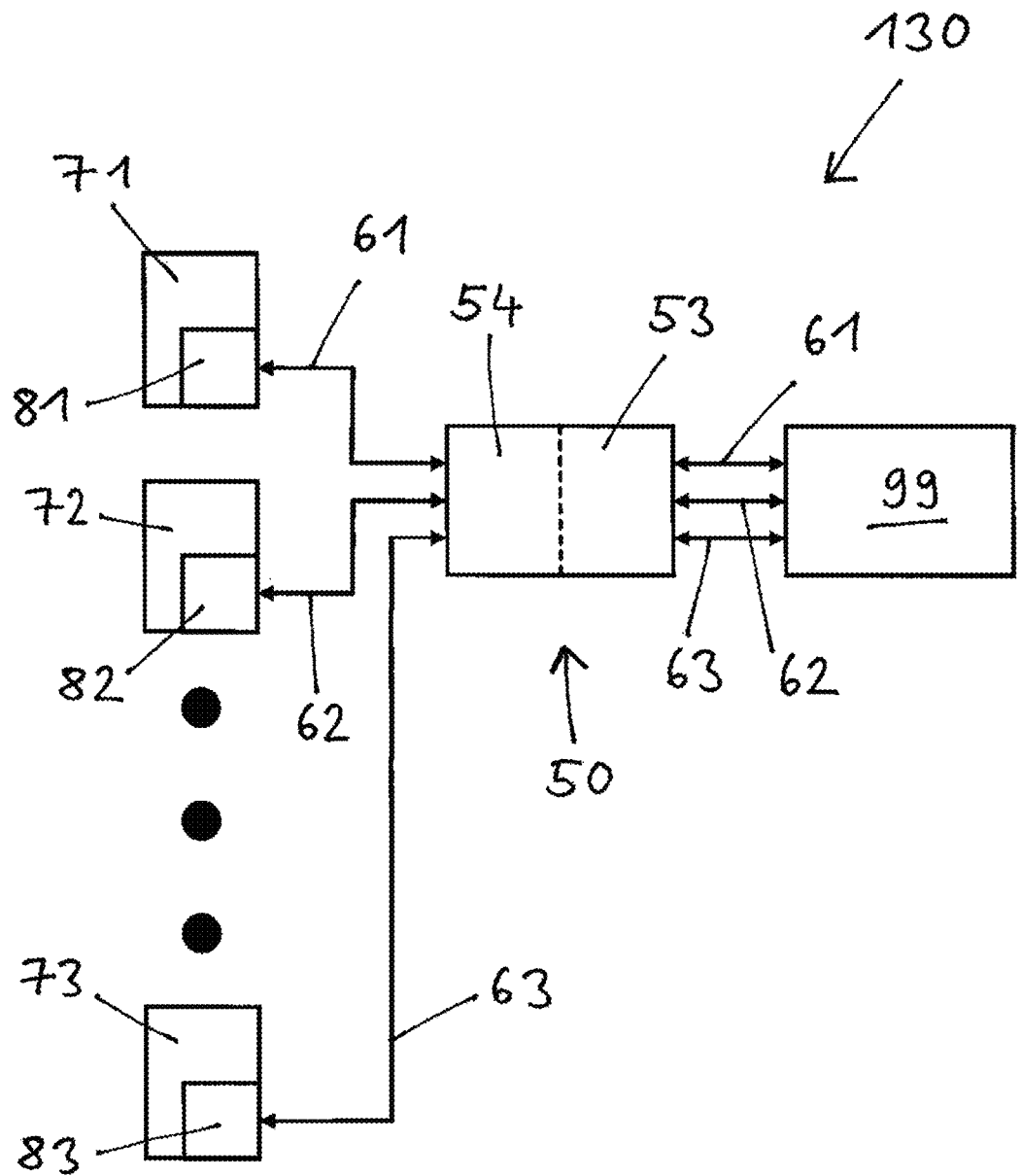
FIG. 6 shows a block diagram of a further exemplary embodiment of the device according to the invention.

FIGS. 4, 5 and 6 schematically illustrate in each case three microscope components 71, 72, 73, the rotary feedthrough 50 and the microscope controller 99. Further microscope components can be present in each case, represented by the large black dots. In FIGS. 4 and 6, the microscope components 71, 72, 73 can be, for example, P&C cubes that are known in principle. In FIGS. 4 to 6, the functional components 81, 82, 83 can be in each case a Maxim ACR component.

In the variant of a device 110 according to the invention as illustrated in FIG. 4, both a power supply and a data transfer between the microscope controller 99 and the microscope components 71, 72, 73 are effected via a single 1-wire bus 64. In this example, the rotary feedthrough 50 can be of simple nature and, if an earth line can be realized by metallic housings, need in principle provide only one electrical connection. If an earth line is not possible by way of the housings, the rotary feedthrough 50 must enable two electrical connections.

In the example of a device 120 according to the invention as shown in FIG. 5, the power supply is effected via a separate line 66 and the data transfer is effected via a digital bus 65. The digital bus can be e.g. an i$^2$C, an SPI or a CAN bus. The microscope components 71, 72, 73 can also be motorized objectives, for example, in FIG. 5. In this case, the functional components 81, 82, 83 can also be omitted. The digital bus can be a CAN bus, for example, for this purpose of use.

In the example of a device 130 according to the invention as illustrated in FIG. 6, the power supply and the data transfer to each of the microscope components 71, 72, 73 are effected via an individual 1-wire bus 61, 62, 63.

In the variants in FIGS. 4, 5 and 6, the data transfer can be unidirectional or bidirectional in each case. In the case of unidirectional data transfer, the microscope controller 99 only reads data from the functional components 81, 82, 83. In the case of a bidirectional data transfer, data can also be communicated to the functional components 81, 82, 83, via the functional components 81, 82, 83 to the microscope components 71, 72, 73 and/or directly to the microscope components 71, 72, 73. The data can contain for example control commands to the microscope components 71, 72, 73. The functional components 81, 82, 83 can be omitted in the case of some or all of the microscope components 71, 72, 73. The microscope components 71, 72, 73 can then be in contact with the controller 99 directly.

The present invention specifies a novel device for incorporation into a microscope with which the following significant advantages and possibilities for use are achieved:

All microscope components mounted on a turret can be recognized automatically upon every apparatus start and also during use. All functions (actuator functions, motorized functions, data transfer functions) are activatable at any time independently of the rotational position of a turret and even during a rotation of the turret. All of these functions are then activatable independently of whether or not the microscope component respectively addressed is situated in the beam path. Specific components to be initialized and/or to be set electrically, for example motorized objectives, can already be initialized and/or suitably set before they are actually introduced into the beam path by rotation of the turret.

Limitations with regard to the capacity of storage components assigned to the microscope components (in particular by way of separate functional components) are obviated. Rather, it is possible to use storage components having substantially any desired storage capacity and substantially any desired bus link.

LIST OF REFERENCE SIGNS

30 Static part of the device 100 (stator)
40 Rotating part of the arrangement (turret, rotor)
41 Mounting location, mount
42 Mounting location, mount
43 Mounting location, mount
44 Mounting location, mount
50 Rotary feedthrough
53 Static part of the rotary feedthrough 50
54 Rotating part of the rotary feedthrough 50
56 Position sensor (magnetic, optical, etc.)
60 Electrical lines for power supply and data transfer
61 Individual 1-wire bus
62 Individual 1-wire bus
63 Individual 1-wire bus
64 Joint 1-wire bus
65 Digital bus
66 Power supply
67 Electrical line
68 Contacting device, contact unit
69 Electrical line
70 Optical axis
71 Optical unit component
72 Optical unit component
73 Optical unit component
74 Optical unit component
81 Functional component, identification component
82 Functional component, identification component
83 Functional component, identification component
84 Functional component, identification component
91 Light source
92 Sample
93 Holder for sample
94 Stand
95 Tube
96 Control computer, PC
97 Eyepiece and/or camera
98 Base
99 Controller of the microscope
100 Device according to the invention
110 Device according to the invention
120 Device according to the invention
130 Device according to the invention
200 Microscope according to the invention

What is claimed is:

1. Device for incorporation into a microscope, the device comprising:
   a stator for connecting to a static component of a microscope,
   a rotor arranged rotatably relative to the stator, wherein the rotor has a plurality of mounting locations configured in each case for receiving a microscope component,
   an electrical rotary feedthrough comprising a first part, which is connected to the stator, and a second part, which is connected to the rotor, and
   at least one electrical connection formed via the electrical rotary feedthrough between the stator and the rotor, and
   wherein an electrical connection is formed on the rotor from the second part of the rotary feedthrough to at least one of the mounting locations for the purpose of electrically contacting the microscope component that is to be arranged in said mounting location.

2. Device according to claim 1,
   wherein at least one of the microscope components to be received by the mounting locations is an optical unit component.

3. Device according to claim 1,
   wherein
   an electrical connection is formed on the rotor from the second part of the rotary feedthrough to each of the mounting locations for the purpose of electrically contacting microscope components that are to be arranged respectively in the mounting locations.

4. Device according to claim 1,
   further comprising a contacting device at at least one of the mounting locations, for the purpose of contacting functional components respectively connected to microscope components that are to be arranged in the respective mounting locations.

5. Device according to claim 1,
wherein
at least one of the mounting locations of the rotor is equipped with a microscope component.

6. Device according to claim 1,
wherein
a functional component is fitted to at least one of the microscope components.

7. Device according to claim 6,
wherein
the functional component provides at least one of the following functions: identifying the microscope component on which the functional component is arranged, providing information about the respective microscope component on which the relevant functional component is arranged, a sensor function, an actuator function, an interface function to further constituents of the microscope components.

8. Device according to claim 1,
further comprising a position sensor for determining a rotational position of the rotor relative to the stator.

9. Device according to claim 1,
wherein
the rotary feedthrough has electrical lines for realizing a bus system for connecting at least one of the microscope components.

10. Device according to claim 9,
wherein the bus system is at least one of a 1-wire bus or a digital bus system.

11. Device according to claim 1,
wherein the rotary feedthrough has power supply lines for a power supply of at least one of the microscope components.

12. Device according to claim 1,
wherein the rotary feedthrough has electrical lines for realizing a data connection to at least one of the optical unit components or the functional components fitted to the optical unit components.

13. Device according to claim 1,
which is embodied as an objective turret or a filter changer.

14. Microscope comprising:
at least one microscope objective,
a holder for holding a sample to be examined,
a light source for providing illumination light, and
a device according to claim 1.

15. Microscope according to claim 14,
further comprising a microscope controller, which is connected to the device via at least one of a bus system or power supply lines.

16. Method for contacting microscope components on a rotor of a microscope using the device according to claim 1,
mounting a microscope component at at least one of the mounting locations of the rotor,
wherein the at least one microscope component for at least one of the energy supply thereof and the driving thereof is electrically connected to a microscope controller via the rotary feedthrough.

17. Method according to claim 16,
wherein
a functional component is fitted to at least one of the microscope components, and
wherein at least one of the functional components provides at least one of the following functions: Identifying the respective microscope component on which the relevant functional component is arranged, providing information about the respective microscope component on which the relevant functional component is arranged, a sensor function, an actuator function, an interface function to further constituents of the microscope components.

18. Method according to claim 17,
wherein
the microscope components are identified by way of a functional component respectively present.

19. Method according to claim 16,
wherein
the microscope components mounted on the mounting locations of the rotor are identified automatically upon an apparatus start of the microscope and/or during the operation of the microscope.

20. Method according to claim 16,
wherein the microscope components mounted on the mounting locations of the rotor are identified automatically during the operation of the microscope.

21. Method according to claim 16,
wherein the microscope components mounted on the mounting locations of the rotor are identified automatically when the rotor is at a standstill in comparison with the stator.

22. Method according to claim 17,
wherein
at least one of identifying, driving, reading or operating of at least one of the microscope components and the functional components is carried out independently of the rotational position of the rotor.

23. Method according to claim 17,
wherein at least one of identifying, driving, reading or operating of at least one of the microscope components and the functional components is carried out independently of whether or not the rotor is rotating.

24. Method according to claim 16,
wherein
microscope components that are to be initialized or set electrically in a specific manner are initialized or set before they are brought into the beam path of the microscope as a result of rotation of the rotor.

* * * * *